United States Patent [19]

Björkman

[11] Patent Number: 4,867,556
[45] Date of Patent: Sep. 19, 1989

[54] APPARATUS FOR DETERMINING THE PATH OF A PULSED LIGHT BEAM

[75] Inventor: Bengt H. Björkman, Järfälla, Sweden

[73] Assignee: U.S. Philips Corporation, New York, N.Y.

[21] Appl. No.: 109,802

[22] Filed: Oct. 16, 1987

[30] Foreign Application Priority Data

Oct. 16, 1986 [SE] Sweden ................... 8604390

[51] Int. Cl.$^4$ ................... G01B 11/26; G01N 21/00
[52] U.S. Cl. ................... 356/1; 356/150; 356/152; 356/338; 356/340
[58] Field of Search ................... 356/1, 5, 152, 150, 356/338, 340, 343

[56] References Cited

U.S. PATENT DOCUMENTS

| | | | |
|---|---|---|---|
| 4,212,534 | 7/1980 | Bodlaj | 356/1 |
| 4,289,397 | 9/1981 | Itzkan et al. | 356/5 |
| 4,538,907 | 9/1985 | Rocchi | 356/1 |
| 4,614,426 | 9/1986 | Baxter et al. | 356/1 |

FOREIGN PATENT DOCUMENTS 2151871 7/1985 United Kingdom .

Primary Examiner—Thomas H. Tarcza
Assistant Examiner—Linda J. Wallace

[57] ABSTRACT

Apparatus measures the scattered radiation received by a detector device in a measuring station (F) situated on the side of the beam path (O). The detector device has a sensitivity lobe which has a given limited lobe width ($2\Delta\theta$) and which lobe can assume different angles ($\alpha$) relative to a reference line (R). In the measuring station (F) the time distance between the front flank and the rear flank of the scattered radiation reaching the detector device, i.e. the pulse width or the pulse length of the scattered radiation, is determined in at least two different angular positions ($\alpha$) of the sensitivity lobe. The position of the light beam path is then determined by means of the measured pulse widths in combination with the associated known angular positions of the sensitivity lobe.

7 Claims, 1 Drawing Sheet

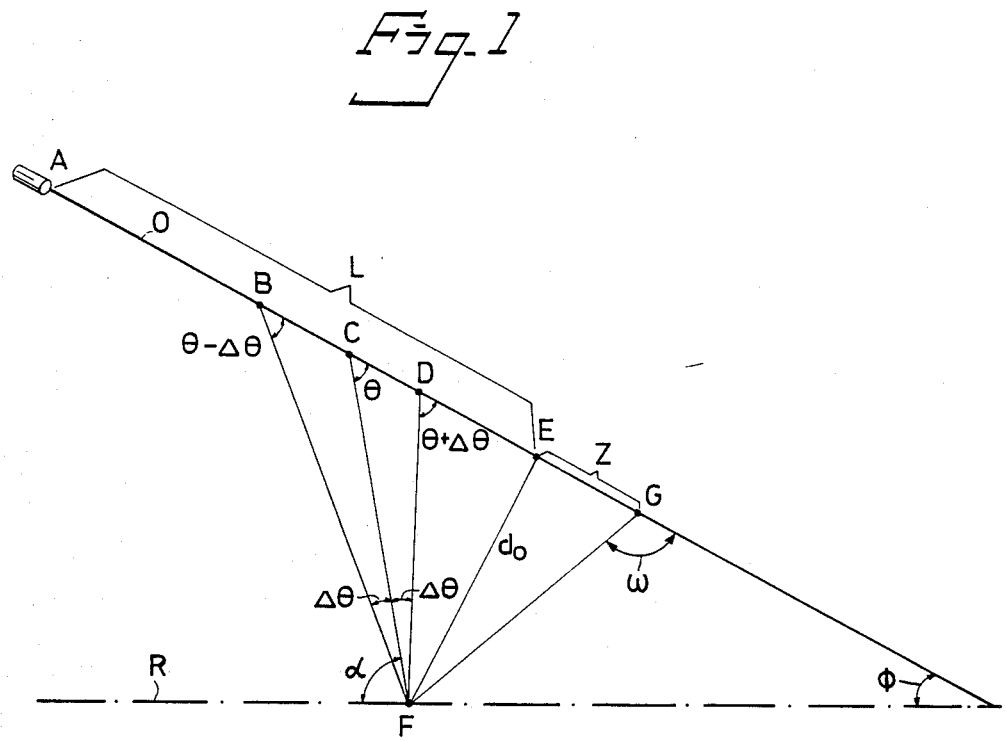
Fig. 1
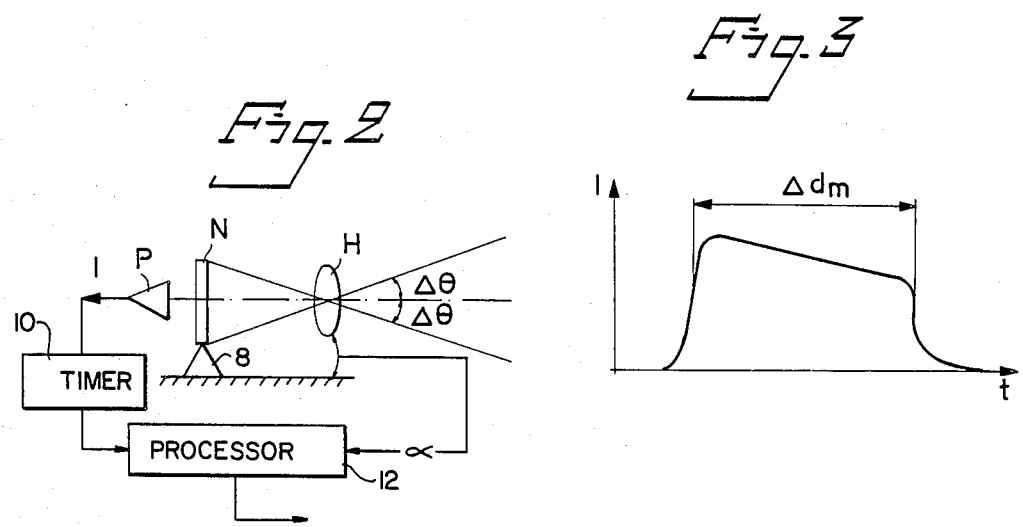
Fig. 2
Fig. 3

APPARATUS FOR DETERMINING THE PATH OF A PULSED LIGHT BEAM

BACKGROUND OF THE INVENTION

The invention relates to an apparatus for determining the path of a pulsed light beam passing through an air space, which apparatus comprises a light sensitive detector system in a measuring station situated on the side of the beam path.

Such an apparatus is known from the published British patent application No. 2.151.871. In this case the light sensitive detector system has a number of fixed sensitive lobes at known angular distances relative to each other, whilst at least three of these lobes must be directed towards the beam path to be determined. When a light pulse passes in its path through these three sensitive lobes, the light sensitive detector system will receive pulses of scattered radiation in successive order in the three sensitive lobes. A time measuring circuit connected to the detector device measures the moments of arrival for the scattered light in the three lobes and determines the mutual time distance between these moments of arrival. The time difference depends upon differences in travelling distance in the three lobes, on the one hand for the light pulse itself causing the scattered radiation and on the other hand for the scattered radiation, at the reception of this scattered radiation in the three lobes. These travelling distance differences are caused by geometrical conditions and can be expressed in simple geometrical relationships comprising the known lobe directions and two variables, which describe the unknown beam path. By means of at least two measured time distances the beam path can be determined with the use of these relationships.

A characteristic property of this apparatus is that it can determine the path for one single light pulse, provided that the scattered radiation from the light pulse can be intercepted by the detector device via at least three lobes. It can therefore be used for measuring the path also for distance laser devices, which in principle need only transmit one single pulse to have full information about the desired distance.

A drawback of the known apparatus is that the detector system is complicated and expensive if it is to cover a large part of the space, for example 360°. In spite of this in a practical embodiment of the device it may only be ensured that scattered radiation can be detected via the requried minimum of three lobes. This may involve low accuracy of determining the path.

SUMMARY OF THE INVENTION

The object of the invention is to provide an apparatus which permits determining the beam path with greater accuracy and provides the possibility of using a simpler detector system as compared with the known solution.

According to the invention the detector system has at least one light sensitive detection device with a sensitivity lobe having a given limited lobe width. The detector system is arranged to measure the time distance between the front flank and the rear flank of light scattered from a light pulse during its passage through a sensitivity lobe, i.e. the pulse width or pulse length of the scattered radiation, in at least two different directions.

The apparatus according to the invention is further characterized in that the apparatus is arranged to determine the light beam path from the measured pulse widths in combination with the associated lobe directions.

By measuring the time moment both for the front flank and the rear flank of the scattered radiation reaching the detector device in each sensitivity lobe direction in accordance with the invention, measurement in principle only has to be made in two sensitivity lobes in order to be able to determine the beam path. Measurements in three lobes will already produce an over-determination, which can be utilized to eliminate inaccuracies in the measurement.

In a preferred embodiment the sensitivity lobe of the detection device is rotatable during the course of a measurement to determine the pulse width of the radiation scattered from a repeatedly pulsed light beam in at least two different angular positions of the sensitivity lobe. Such a detection device with a rotatable sensitivity lobe is appreciably simpler than one having a number of fixed lobes covering the desired part of space. As measurement then takes place in different rotational positions and thus at different time moments, however, it is necessary in this case to have several light pulses propagating in the path to be determined. This is, for example, true for laser target seekers. By suitable choice of the rotational speed of the sensitivity lobe relative to the light pulse frequency in the path, measurement can then be effected in a large number of directions, for example five or more, which will increase the accuracy of determining the path.

The invention is based on the recognition that the width or length of the pulses of scattered radiation at the measuring station will vary from measurement to measurement, i.e. from one position to another position of the sensitivity lobe, in a manner which depends upon the position of the light beam path relative to the measuring station. The position of the beam path be expressed, for example by means of the following two variables: shortest distance between the beam path and the measuring station and the angle between the path and a fixed reference direction passing through the measuring station. Besides these unknown variables the measured pulse width will depend upon the direction of the sensitivity lobe, which is known for each measurement, as well as upon the known width of the sensitivity lobe.

On deriving the relationship between the pulse width measured by the detector device and the known parameters as well as the unknown variables it was proved that these relationships cannot be reduced so that the unknown variables can be expressed explicitly. The calculation of the position of the path while using a number of measuring values, relating to measured pulse widths and corresponding lobe directions, is therefore suitably effected by using an iterative calculation method. It is, however, alternatively possible to determine the position of the path by searching in a table, which has been made in advance with the aid of the said relationships.

In the foregoing principle discussion the length of the primary light pulses, which caused the scattered radiation, is assumed to be so small that it can be neglected. If this is not true, the length of the light pulses will also influence the measured pulse width and this primary pulse length then will appear as a third unknown variable. If measuring values are present in at least three lobe directions, the pulse length can in principle also be determined. With an even largernumber of measuring values for one and the same light beam path it is also possible to eliminate other measurement inaccuracies, for example caused by signal noise.

BRIEF DESCRIPTION OF DRAWING

FIG. 1 is a schematic view of a system for determining the position of a laser beam path FIG. 2 shows schematically how a detector device for measuring scattered light from a light pulse can be constructed and FIG. 3 shows a time diagram illustrating the variation of a signal obtained in the detector device with time.

DETAILED DESCRIPTION OF THE PREFERRED EMBODIMENT

According to FIG. 1 a laser transmitter is situated at the point A and delivers pulses in a path the centre of which is defined as the optical axis O. As a result of contact with particles in the air scattered radiation will be delivered from the pulse along the whole path. A laser receiver or laser warner placed at the point F situated on the side of the optical axis receives the scattered radiation, when the laser pulse is within the limits for the sensitivity lobe of the receiver. In the example given in FIG. 1 the limits of the sensitivity lobe of the receiver intersect the optical axis O at the points B and D, while the centre line of the sensitivity lobe intersects the optical axes at the point C. The lengthof the received pulse $\Delta d_m$ detected by the detector device at the point F then will be equal to the difference in time it takes for radiation to travel from point B to point F via point D and directly from B to F or:

$$\Delta d_m = BD + DF - BF \quad (1)$$

In this formula, and in the derivation further down, the same symbols are used to denote the distance between two points or the length of a path and the time it takes for radiation to travel over that distance or path.

The position of the optical axis O of the laser lobe is determined relative to a reference line R passing through the measuring point F. The laser path is more closely determined by two variables: on the one hand the angle $\phi$ between the reference line R and the optical axis O and on the other hand the shortest distance $d_o$ between the optical axis O and the measuring point F. The shortest distance between the axis O and the measuring point is along the normal to the axis through the measuring point, which normal intersects the optical axis at the point E. Thus, the magnitudes $\phi$ and $d_o$ are the variables to be calculated by means of the method according to the invention.

Known parameters for the calculations are the angle $\alpha$ between the centre line of the sensitivity lobe of the receiver and the reference line R and also the angle enclosed by the sensitivity lobe. According to FIG. 1 the said last-mentionedangle is designated by $2\Delta\theta$. Furthermore, $\theta$ in FIG. 1 designates the angle between the centre line of the sensitivity lobe and the optical axis of the laser path. This angle $\theta$ is unknown and represents an auxiliary magnitude which is used when determining the mathematical relationships for calculation of $d_o$ and $\phi$.

FIG. 2 shows the basic construction of a light sensitive detector device, which is placed at the measuring point F. The device consists of a lens system, represented in the drawing by the collection lens H, a detector plate N and an amplifier P. A current I will appear at the output of the amplifier, which current represents the number of photons which are caught per time unit by the detector plate, i.e. within the sensitivity lobe $2\Delta\theta$. Furthermore, there is a rotary mechanism 8, whereby the sensitivity lobe can be caused to assume different angular positions in a given plane. This mechanism may comprise a system of moveable mirrors or alternatively a rotary device for the whole detector. In FIG. 1 the rotary plane coincides with the plane of the drawing and rotation of the sensitivity lobe involves setting of the angle $\alpha$ to different known values. Rotation can be effected continuously, the rotation speed then being so small relative to the light speed that $\alpha$ can be regarded as constant during each measurement.

Any known detector device which has a rotatable sensitivity lobe and sufficient sensitivity can be used as detector device at the measuring point F.

When a light pulse travels in its path along the axis O and the sensitivity lobe of the receiver is directed towards this path, the receiver will catch scattered radiation from the pulse as long as this pulse is situated within the sensitivity lobe. This will give rise to a current pulse in the receiver, which can vary with time t in the manner as shown in FIG. 3. The measuring value, which is utilized for the calculation of the laser path, is the length or width of the received pulse which is designated by $\Delta d_m$ in the Figure. For each measurement this pulse length or pulse width is determined by timer 10 in processor 12 and stored together with the associated value of the angle $\alpha$. When at least two related values on $\Delta d_m$ and $\alpha$ are present, the angle $\theta$ and the distance $d_o$ can be calculated. Further measuring values can be utilized for improving the accuracy of the calculations.

The basic equation is the relationship (1) which is given in the foregoing and which is valid under the condition that the length of the primary laser pulse, which caused the detected scattered radiation, can be neglected.

In the following derivation of the relationships to be used for the calculation a point G is defined on the optical axis O, which point G can assume an arbitrary position along the axis O. Furthermore, with reference to FIG. 1, the following magnitudes are defined:

$z = EG$ $L = AE$ $d_m = AG + GF - AE$

It is repeated that the time it takes for radiation to travel along a distance is denoted by the same symbol as that distance itself. The magnitude z is a signal variable, z is positive if the point g is in between the source A and the point E, z is negative if, as in FIG. 1, G is further away from A than the point E.

With the above defined variables the following equations are valid:

$$d_m = L - z + \sqrt{d_o^2 + z^2} - L \quad (2)$$

$$\tan\omega = d_o/z \quad (3)$$

By taking $d_o$ from (2) and replacing $d_o/z$ with tgw according to (3) the following relation will be obtained after usual trigonometric simplifications:

$$d_m/d_o = \frac{1 - \cos\omega}{\sin\omega} = \frac{2\sin^2(\omega/2)}{2\sin(\omega/2)\cos(\omega/2)} = \tan(\omega/2) \quad (4)$$

Now the length of the received pulse can be expressed by taking the difference between $d_m$ ;I for $G=D$ $(w=\theta+\Delta\theta)$ and $d_m$ for $G=B$ $(w=\theta-\Delta\theta)$.

As $$\tan\tfrac{1}{2}(\theta\pm\Delta\theta) = (\sin\theta\pm\sin\Delta\theta)/(\cos\theta+\cos\Delta\theta) \quad (5)$$

then the following is valid:

$$\Delta d_m/d_o = \frac{\sin\theta + \sin\Delta\theta}{\cos\theta + \cos\Delta\theta} - \frac{\sin\theta - \sin\Delta\theta}{\cos\theta + \cos\Delta\theta}$$

After simplification the following is obtained:

$$\Delta d_m/d_o = 2\sin\Delta\theta/(\cos\theta + \cos\Delta\theta) \quad (6)$$

As the angle $\alpha$ is known but $\theta$ is not known, we write as follows:

$$\theta = \alpha - \phi \quad (7)$$

where $\phi$ is the angle to be calculated After substitution of the equation (7) the following is obtained:

$$\Delta d_m/d_o = 2\sin\Delta\theta/(\cos(\alpha-\phi) + \cos\Delta\theta) \quad (8)$$

If the $n^{th}$ measurement is marked with index n, the following is obtained after re-writing equation (8):

$$\Delta d_{m,n}/d_o = 2\sin\Delta\theta/(\cos(\alpha_n-\phi) + \cos\Delta\theta) \quad (9)$$

If $\phi$ is known then $d_o$ can be determined from the equation (9). The variable $\phi$ is determined from the equation (9) in the following manner:

$$\frac{\Delta d_m,1}{\Delta d_m,2} = \frac{\cos(\alpha_2 - \phi) + \cos\Delta\theta}{\cos(\alpha_1 - \phi) + \cos\Delta\theta} \quad (10)$$

where the variable $\phi$ is implicit.

Thus, the root to the non-linear equation (10) cannot be expressed in closed form. Therefore we have to adopt approximate methods. Under the title "Non-linear equations" in the book of Å. Björk, C Dahlquist "Numerical methods" several usable methods are given, e.g. Newton-Raphsons iteration method.

In the above calculations it has been assumed that the length of the laser pulse is much smaller than the length of the pulse in the receiver. However, this is not always true. In particular for small values of $\theta$ the length of the laser pulse can dominate over the length of the receiver pulse. In practice it can therefore often be assumed that the shortest receiver pulse represents the laser pulse filtered in the receiver.

If the value of the angle $\theta$ cannot be determined, it is possible to convolute the laser pulse with the receiver lobe and the receiver filter and thereafter to solve the length of the laser pulse and remaining magnitudes by means of approximative methods. This will involve heavy calculation work. In those cases, when great accuracy is not required, it is possible to replace the convolution with an approximative expression. A practical form is the following:

$$d_m' = \sqrt{d_L^2 + d_m^2} \quad (11)$$

where $d_m'$ is the length of the measured receiver pulse and $d_L$ is the length of the laser pulse. This means that it is necessary to develop, for example the method according to Newton-Raphson for two variables.

Hitherto it has been assumed that the measurements are exactly correct. This is of course not true. Errors of different kinds will appear in reality. A basic error is the noise in the receiver because it is unavoidable. Besides these are errors connected with the method for measuring the pulse length.

The final error can be decreased by making more than two measurements and then combine the results. The simplest is to calculate several values by means of the Newton-Raphson method from a number of measurements larger than two. Thereafter, the final result is formed as the average value of the partial results. Then values which are clearly senseless are discarded. However, this method is not optimal. An optimal method can be used for a linear system.

As stated hereinbefore, the use of a detector device havig a rotatable sensitivity lobe requires at least two measurements in different directions of the sensitivity lobe and at least two pulses must pass in the path to be determined. However, with a small modification of the detector device, i.e. the device has two mutually fixed sensitivity lobes, the path can in principle be determined already for one single pulse. With different directions of these sensitivity lobes an over-determination can then be obtained, which is utilized to improve the accuracy of the path determination.

What is claimed is:

1. An apparatus for determining the path of a pulsed light beam passing through an adjacent air space, comprising:
    at least one light sensitive detection device with a sensitivity lobe characterized by a first limited lobe width and operative in at least two different lobe directions;
    timing means connected to said detection device for measuring the pulse widths of light scattered from a light pulse during its passage through said sensitivity lobe in said at least two different directions.

2. An apparatus as claimed in claim 1, further comprising processor means for determining the light beam path of said pulsed light beam from the measured pulse widths in combination with the associated lobe directions.

3. An apparatus as claimed in claim 2, characterized in that the sensitivity lobe of the detection device is rotatable during the course of a measurement to determine the pulse width of the radiation scattered from a repeatedly pulsed light beam in at least two different angular positions of the sensitivity lobe.

4. An apparatus as claimed in claim 3, characterized in that the apparatus comprises a detector system with two sensitivity lobes each having a given limited lobe width, which lobes are mutually fixed.

5. An apparatus as claimed in claim 1, characterized in that the sensitivity lobe of the detection device is rotatable during the course of a measurement to determine the pulse width of the radiation scattered from a repeatedly pulsed light beam in at least two different angular positions of the sensitivity lobe.

6. An apparatus as claimed in claim 1, characterized in that the apparatus comprises a detector system with two sensitivity lobes each having a given limited lobe width, which lobes are mutually fixed.

7. An apparatus as claimed in claim 2, characterized in that the apparatus comprises a detector system with two sensitivity lobes each having a given limited lobe width, which lobes are mutually fixed.

* * * * *